UNITED STATES PATENT OFFICE 2,325,176

REFINING OF NONFERROUS METAL FUME

Louis Scott Deitz, Jr., Westfield, N. J., assignor to Nassau Smelting & Refining Company, Incorporated, New York, N. Y., a corporation of New York No Drawing. Application December 5, 1941, Serial No. 421,770

10 Claims. (Cl. 75—25)

This invention relates to the refining of materials containing non-ferrous metals and more particularly to the refining of tin-lead residues containing antimony.

In one process of refining low grade copper scrap, a residual fume is produced which contains lead, tin, antimony, zinc, and sometimes copper, chiefly as oxides. It has been the practice prior to applicant's invention, to extract the zinc from this material but no known commercial process has been developed for further extracting the metal values therefrom, and especially for the separation of the antimony from the tin.

An object of applicant's invention is to provide an efficient and economical process for extracting metallic values from materials containing non-ferrous metals.

In one embodiment of the present invention, a residual material containing non-ferrous metals and consisting principally of compounds of lead and tin along with small amounts of antimony compounds and possibly copper compounds, is roasted and subjected to a sulfuric acid leach to remove the copper, if it be present. The solid residue is then roasted with an alkali carbonate and leached with an alkali carbonate solution to remove the antimony, after which the solid residue is smelted to recover the remaining metals.

Other objects and features of applicant's invention will appear from the following detailed description thereof:

It has been the practice in the treatment of certain low grade copper scrap, to blow molten blast furnace metal to obtain a fume containing lead, tin, antimony and zinc chiefly as oxides, although some sulphates are also present. This fume is leached with sulphuric acid to extract the zinc and the dried residue resulting from this zinc extraction is a material which may be refined by the process of this invention. The residue may have approximately the following analysis:

| Cu | Pb | Sn | Sb | S | Balance |
|---|---|---|---|---|---|
| Per cent 2.05 | Per cent 39.37 | Per cent 14.60 | Per cent 3.48 | Per cent 6.51 | Oxides, oxygen combined as sulphates, and acid insolubles |

A preferred embodiment of the invention is as follows:

The raw residue is first ground in a standard type of ball mill to pass through a 60 mesh screen and is then roasted for about one hour in the presence of air to oxidize the copper. The roasting may be accomplished in a multiple hearth furnace provided with moving rakes for continuous rabbling, at a temperature of about 900° F. The roast is followed by a leach with a hot 16% sulphuric acid solution. A typical analysis of the metals in the residue as it leaves this last operation after washing and filtering is as follows:

| Cu | Pb | Sn | Sb |
|---|---|---|---|
| Per cent 0.51 | Per cent 73.04 | Per cent 24.23 | Per cent 2.22 |

The spent leaching solution, which contains 96% of the copper and 20 to 50% of the antimony, is passed through an electrolytic depositing out tank having insoluble anodes in which the copper is plated out on the cathode. The antimony is caused to precipitate as the oxychloride by adding hydrochloric acid to the solution. The solution is then filtered and the regenerated acid is used for further leaching.

The solid residue is mixed with sodium carbonate in the proportions of about 100 pounds of residue to about 50 pounds of sodium carbonate. This mixture is then roasted at about 1200° F. for two hours in a suitable furnace, preferably such as was used for the oxidizing roast. This roasted product is pulverized and leached with a 10–15% solution of sodium carbonate to leach out antimony and washed with water. It is important to note in this connection that this soda leach dissolves only the antimony and leaves the metal content otherwise substantially unchanged.

The lixiviant containing sodium carbonate, sodium sulphate and soluble antimony is diluted and allowed to stand, preferably being heated while standing, until most of the antimony is hydrolyzed and comes down as a precipitate. A sufficient quantity of the supernatant liquor is bled off to maintain the sodium sulphate concentration at a constant value which will prevent the formation of insoluble sulphates, and the remaining liquor is recirculated as leach solution for the material that has been roasted with sodium carbonate.

The residue now contains the lead in the form of the carbonate, and may therefore be smelted without excessive loss to yield a rough solder metal of approximately the following analysis:

| Cu | Pb | Sn | Sb |
|---|---|---|---|
| Per cent 1.07 | Per cent 72.97 | Per cent 24.98 | Per cent 0.98 |

By this procedure over 90% of the copper and 90% of the antimony is separated from the tin and lead without material loss of either tin or lead. In addition, the tin and lead residue is in such form that it can be smelted readily.

The roasting and subsequent leach with sulphuric acid may be omitted, if desired, and only the roasting operation with sodium carbonate used. The antimony removal, in this case, is approximately 70 to 80%. Copper, tin, and lead are not leached out by this soda leach and the product of the subsequent smelting operation will be a rough Babbitt metal.

In order that applicant's invention may be more clearly understood, the following specific example is given:

A 100 gram sample of the raw fume analyzed:

Copper _____ 2.05
Lead _____ 39.73
Tin _____ 14.60
Antimony _____ 3.48
Sulfur _____ 6.51

This material was ground to 60 mesh, roasted at 1000° F. for 1½ hours and leached with 2.0 cc. of 16% sulphuric acid at 80° to 90° C. After washing with 330 cc. of water, the lixiviant contained: 1.77 grams of copper, no lead, 1.2 grams of tin, and 2.3 grams of antimony.

The solid residue had a dry weight of 86.8 grams and retained .28 gram of copper, 39.4 grams of lead, 13.1 grams of tin and 1.2 grams of antimony. To this residue was added 60.8 grams of sodium carbonate. The resulting mixture was roasted at 1292° F. for 80 minutes and then ground to 60 mesh. Using a 10% sodium carbonate solution, the roasted material was leached free of antimony. About .6 gram of antimony was recovered by diluting the lixiviant with wash water and heating to hydrolyze and thus precipitate the antimony. There was no copper, lead or tin in the lixiviant.

The soda leach residue weighed 75.4 grams, and analyzed: copper, 0.28 gram, lead, 39.4 grams, tin, 13.4 grams, antimony, 0.55 gram, and no sulfur. When smelted to a rough solder, the metal had the following composition:

Copper_____ 0.28 gram or .52%
Lead_____ 39.40 grams or 73.50%
Tin_____ 13.40 grams or 25.00%
Antimony_____ .55 gram or 1.00%

In the above example the sulphuric acid leach removed 86% of the copper, 65% of the antimony, and 8% of the tin. The soda leach removed 26% more of the antimony but none of the lead and tin, so that the final product had 86% of the copper and 91% of the antimony removed. Thus, this soda leach process, unlike most other leaching processes, removes but a single metal, antimony, and none of the other metals.

While a preferred embodiment of the invention has been described, modifications therein may be made without departing from the scope of the appended claims. The sodium carbonate, for example, may be replaced by any alkali carbonate.

What is claimed is:

1. A method of extracting metal values from a fume consisting principally of lead and tin and containing a small but substantial amount of antimony, which comprises roasting such a material with an alkali carbonate and treating the roasted material with a solution of an alkali carbonate to remove the antimony.

2. A method of refining non-ferrous metal fume consisting principally of lead and tin and containing a small but substantial amount of antimony, which comprises roasting such a fume with sodium carbonate and treating the roasted material with a solution of sodium carbonate to remove the antimony.

3. A method of extracting metal values from tin-containing metal fume whose principal single element is lead with less than about 5% of antimony also present, which comprises roasting such a fume with an alkali carbonate and treating the roasted material with a solution of an alkali carbonate to remove the antimony.

4. A method of refining non-ferrous metal fume consisting principally of lead and tin and containing not more than about 5% of antimony, which comprises roasting such a fume with sodium carbonate, leaching the roasted material with a solution of sodium carbonate to remove the antimony, and smelting the solid residue.

5. A method of refining non-ferrous metallic fume consisting principally of lead and tin and containing small but substantial amounts of copper and antimony, which comprises roasting and leaching such a metal fume to remove copper, roasting the residual fume material with alkali carbonate, leaching the roasted material with a solution of alkali carbonate to remove the antimony, and smelting the solid residue.

6. A method of refining non-ferrous metallic fume consisting principally of lead and tin and containing small but substantial amounts of copper and antimony, which comprises roasting and leaching such a metal fume to remove copper, roasting the residual fume material with sodium carbonate, leaching the roasted material with a solution of sodium carbonate to remove the antimony, and smelting the solid residue.

7. A method of refining non-ferrous metallic fume consisting principally of metal of a group consisting of lead and tin and containing not more than about 5% each of copper and antimony, which comprises removing copper from the metal fume, roasting the residual fume with sodium carbonate, and treating the roasted material with a solution of sodium carbonate to remove the antimony.

8. A method for extracting metal values from metal fume consisting principally of lead and tin and containing a small but substantial amount of antimony, which comprises roasting such a fume scrap with sodium carbonate, leaching the roasted material with a solution of sodium carbonate to remove the antimony, hydrolyzing the antimony compound dissolved by the sodium carbonate solution to precipitate an antimony hydroxide, and smelting separately said antimony precipitate and the soda leached residue.

9. A method of extracting metal values from metal fume consisting principally of lead and tin and containing not more than about 5% each of copper and antimony, which comprises pulverizing such a metal fume, roasting and then leaching the pulverized fume with sulfuric acid to remove copper, roasting the residual fume material with half its weight of sodium carbonate, pulveriz_ ing the resulting mass, leaching said mass with a solution of sodium carbonate to remove the antimony, recovering the antimony by diluting and heating the sodium carbonate solution to cause the antimony to hydrolyze, and smelting separately the antimony precipitate and the soda leached residue.

10. A method of refining non-ferrous metal fume consisting principally of metal of a group consisting of lead and tin and containing small but substantial amounts of copper and antimony, which comprises roasting and then leaching such a metal fume to remove the copper, roasting the residual fume with sodium carbonate, leaching the roasted material with a solution of sodium carbonate, to remove the antimony, hydrolyzing the dissolved antimony compound to precipitate another antimony compound, smelting the latter antimony compound to recover the antimony, and smelting the soda leached residue to recover the remaining metals therefrom.

LOUIS SCOTT DEITZ, Jr.